(12) United States Patent
Lee et al.

(10) Patent No.: US 6,307,008 B1
(45) Date of Patent: Oct. 23, 2001

(54) POLYIMIDE FOR HIGH TEMPERATURE ADHESIVE

(75) Inventors: Kyung Rok Lee; Soon Sik Kim; Kyeong Ho Chang, all of Seoul; Jeong Min Kweon, Kyunggi-Do, all of (KR)

(73) Assignee: Saehan Industries Corporation, Kyongsangbuk-Do (KR)

( * ) Notice: Subject to any disclaimer, the term of this patent is extended or adjusted under 35 U.S.C. 154(b) by 0 days.

(21) Appl. No.: 09/512,381

(22) Filed: Feb. 25, 2000

(51) Int. Cl.$^7$ ............................. C08G 73/10; C08G 69/26
(52) U.S. Cl. ..................... 528/353; 528/125; 528/128; 528/171; 528/172; 528/173; 528/174; 528/179; 528/183; 528/185; 528/188; 528/220; 528/229; 528/350; 526/935; 525/422
(58) Field of Search ........................... 528/125, 128, 528/171, 172, 173, 174, 179, 183, 185, 188, 220, 229, 350, 353; 526/935; 525/422

(56) References Cited

U.S. PATENT DOCUMENTS 4,197,397 * 4/1980 D'Alelio ............................. 528/222
4,837,300 * 6/1989 St. Clair et al. ..................... 528/353
6,054,554 * 4/2000 Choi et al. ............................ 528/353

* cited by examiner

*Primary Examiner*—P. Hampton-Hightower
(74) *Attorney, Agent, or Firm*—Harrison & Egbert

(57) ABSTRACT

A polymide useful as an adhesive for semiconductor assemblies having excellent thermal resistance and adhesive strength at high temperatures. The polyimide adhesive is based on the polyimide represented by the following formula II which can be prepared through the thermal or chemical imidization of the polyamic acid represented by the following formula I:

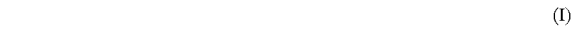

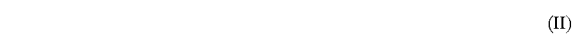

5 Claims, No Drawings

POLYIMIDE FOR HIGH TEMPERATURE ADHESIVE

TECHNICAL FIELD

The present invention relates to a high-temperature adhesive of polyimide and also to a high-temperature adhesive tape of polyimide. More particularly, this invention relates to a polyimide adhesive which has excellent high-temperature stability and bonding strength and is thus capable of having high processability. It also relates to an insulating adhesive tape utilized as a material in electronic industries, the tape having high electrical insulation and heat-resistance properties and capable of being bonded through thermo-melting. Also, the present invention is concerned With lead frames and semiconductor devices employing the tape.

BACKGROUND ART

Polyimide obtained by reacting tetracarboxylic acid dianhydride with diamine is hereafter to be widely used in areas where high-temperature stability is required, by virtue of its various excellent properties and good thermal stability. In addition to the excellent high-temperature stability, polyimide also has good mechanical strength, dimensional stability, flame lame retardance and electrical insulation and is broadly applied in the materials of electric and electronic appliances, aeronautics and space instruments and transport machinery. It is also used as the high-temperature adhesive of various high performance materials in these fields.

Conventional polyimide, however, normally has an excellent thermal stability with a poor melt-feasibility due to its high softening point. On the other hand, the resin developed for improving the melt-feasibility is inferior in high-temperature stability. Thus the performance of polyimide has both merits and drawbacks.

Generally in the use of conventional polyimide, for example, in film manufacture, wire coating, cover sheet or adhesive, the linear chain structure causes high-packing density between chains and limits the chain mobility even in high temperatures. Therefore, conventional polyimide has an excellent thermal stability like a thermoset, but has a poor melt-feasibility and poor adhesive properties. On the other hand, the melt-feasible polyimide, especially in adhesive use, has a lower glass transition temperature and softening point than conventional polyimide. So, melt-feasible polyimide has as a poor thermal stability and a high C.T.E. (Coefficient of Thermal Expansion).

In the polyimide adhesive or adhesive tape in IC package tapes, a good melt-feasibility and a good spreadability onto a substrate like an IC chip, a protective layer on an IC chip or a leadframe are necessary in the bonding process. After bonding, the excellent adhesive property and thermal stability of the adhesive even in subsequent high-temperature processes, such as wire bonding and epoxy molding, are very important to guarantee the semiconductor package reliability.

SUMMARY OF THE INVENTION

The present invention was developed in order to obtain polyimide of good melt-feasibility and also good thermal stability. Another object of the present invention is to provide an insulating adhesive tape employing a polyimide adhesive which can maintain its excellent insulating property for a long period of time. The insulating adhesive tape also has an appropriate adhesive property which can be bonded at the high temperature (the temperature at which adhesion is carried out) of not more than 450° C., in a short adhesion time of not more than 10 seconds, and an adhesive strength sufficient: for use with various semiconductor materials. In. adhesion, the insulating adhesive tape also does not cause contamination damage to the wire bonding on the surfaces of lead frames and IC chips. The insulating adhesive tape has heat resistance large enough to withstand heating during a wire bonding step so that it does not allow a lead to make the slightest movement, thereby making the wire bonding strength high enough to obtain excellent electronic reliability.

To satisfy the above-mentioned properties, a small amount of triamine or tetraamine was used as a monomer instead of diamine to react the polyamic acid or polyimide. Triamine or tetraamine was useful to break the chain structure, to decrease the packing density between chains, and to increase the melt-feasibility and adhesive property of polyimide.

The crosslinking caused-by triamine or tetraamine acts to increase the thermal stability of polyimide especially at the temperature of the wire bonding and epoxy molding process.

DETAILED DESCRIPTION OF THE INVENTION

The object of this invention is to provide polyimide and its polyamic acid precursor because both are excellent in melt-feasibility in addition to being superior in high-temperature stability, which is inherent to polyimide, and have outstanding high-temperature adhesion so as to excellent be for use in multipurpose applications.

This invention provides a polyamic acid resin having recurring units represented by the following Formula I:

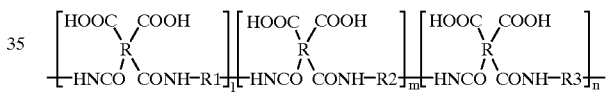

wherein,

R is a tetravalent organic group; R1 is a divalent organic group; R2 is a trivalent or tetravalent organic group; R3 is a divalent organic group represented by the following formula:

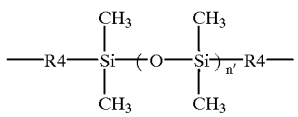

wherein,

R4 is an alkylene group containing 0–20 carbon atoms; and n' is the number of a recurring unit; and l, m and n each are molar numbers of the corresponding recurring units under the condition that l/(m+n) ranges from 99.985/0.015 to 80/15 as expressed in terms of molar ratio and m/l+n) is from 1/2000 to 500/1 as expressed in terms of molar ratio.

This invention further provides a polyamic acid ester resin wherein the carboxyl group in the polyamic acid resin is esterified, and a polyimide resin obtained by subjecting said polyamic acid resin or its corresponding polyamic acid ester resin to a dehydrating or alcohol-eliminating ring-closure.

This invention further provides a polyamic acid resin of Formula I, which is prepared by reacting a diamino compound, including the novel triamino compound or tetraamino compound, with a dianhydride in an organic solvent.

The precursor polymer of this invention is polyamic acid which is obtained from:

(1) a dihydride having the following Formula II:

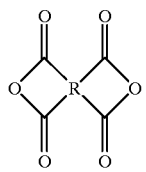

wherein R is a tetravalent radical selected from the group consisting of aliphatic radicals having 2 or more carbon atoms, cyclo-aliphatic radicals, monoaromatic radicals, condensed polyaromatic radicals, and non-condensed polyaromatic radicals wherein aromatic radicals are mutually connected with a bond or a crosslinking function. As examples of the tetravalent radical group R, the following ones can be referred to:

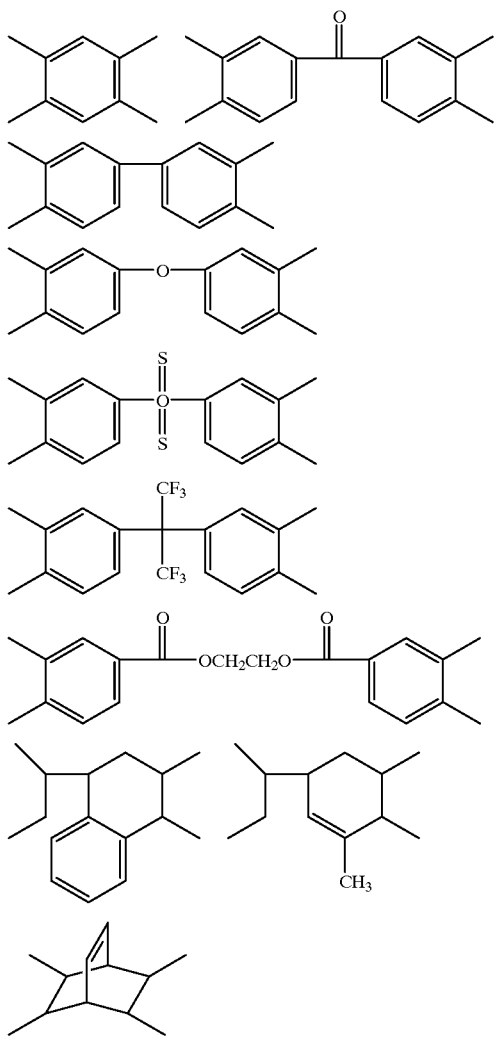

(2) a diamine having the following Formula III:

$$H_2N-R1-NH_2 \qquad (III)$$

wherein R1 is a divalent radical selected from the group consisting of aliphatic radicals, cyclo-aliphatic radicals, monoaromatic -radicals, condensed polyaromatic radicals, and non-condensed polyaromatic radicals wherein aromatic radicals are mutually connected with a bond or a crosslinking function. As examples of the divalent radical group R1, the following ones can be referred to:

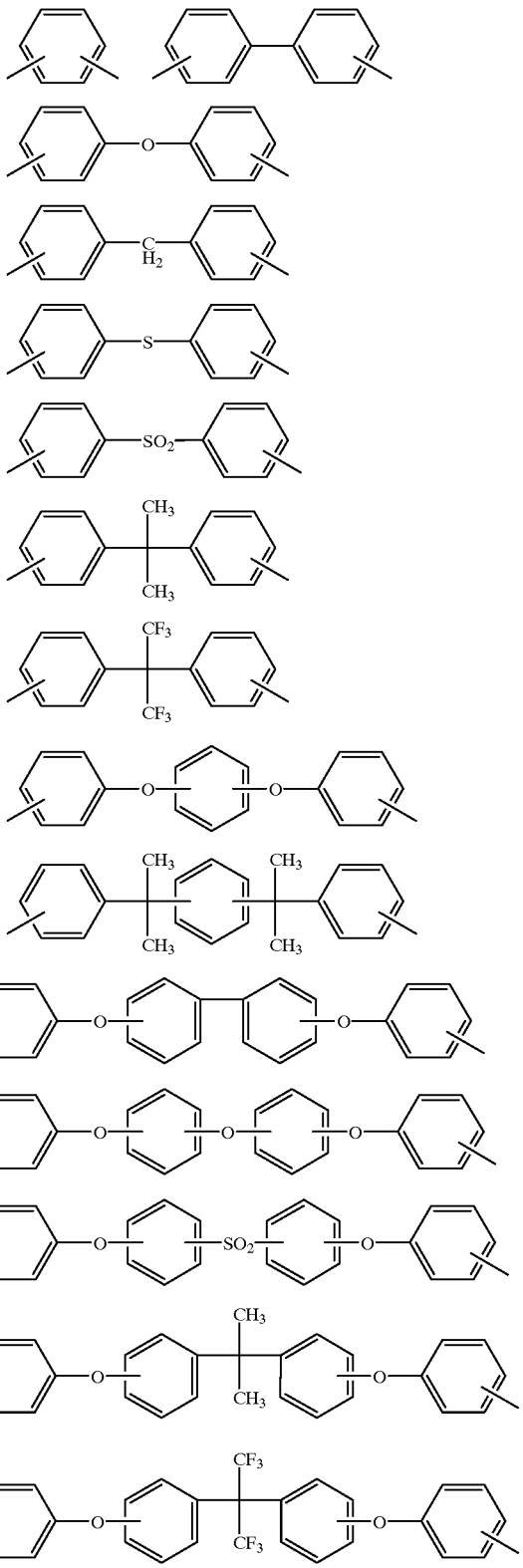

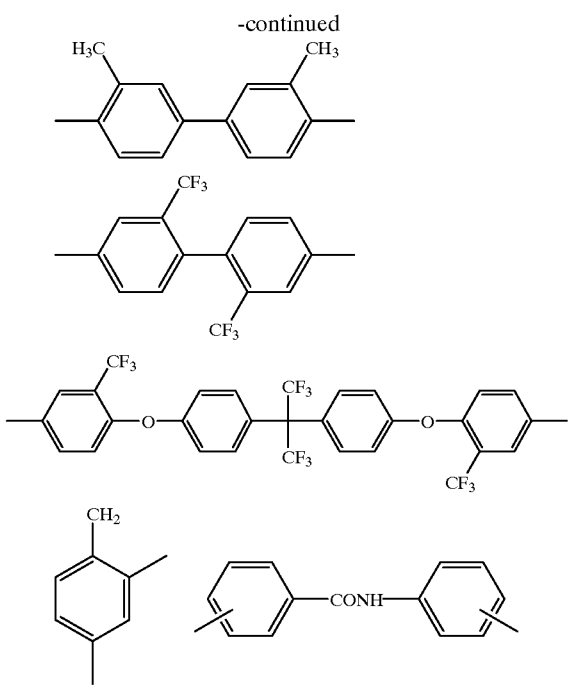

(3) a triamine or a tetraamine having the following Formula IV:

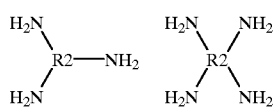

wherein,

R2 is a trivalent or tetravalent radical selected from the group consisting of aliphatic radicals, cyclo-aliphatic radicals, monoaromatic radicals, condensed polyaromatic radicals and non-condensed polyaromatic radicals wherein aromatic radicals are mutually connected with a bond or a crosslinking function. As examples of the trivalent or tetravalent radical group R2, the following ones can be referred to:

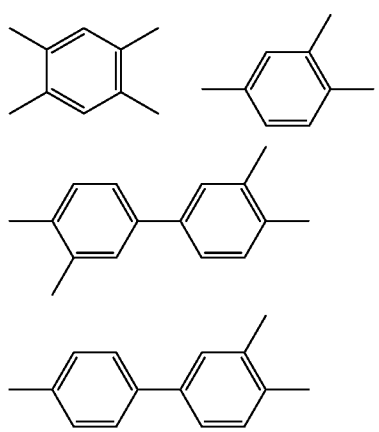

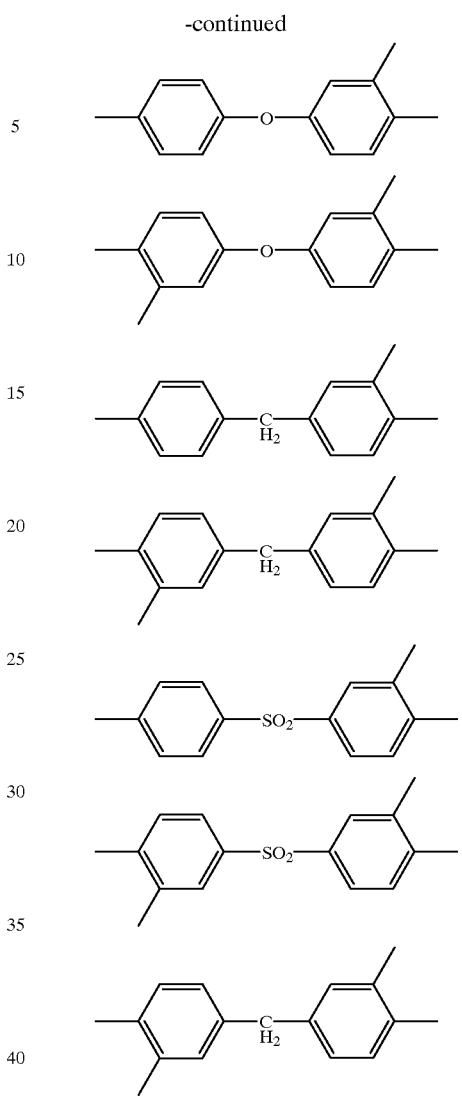

(4) a diamine containing the following siloxane Formula V:

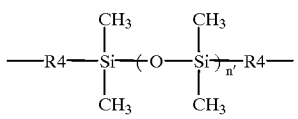

wherein R4 is an alkylene group containing 0–20 carbon atoms n' is the number of a recurring unit.

Preferable, concrete examples of said dianhydride include aromatic tetracarboxylic acid dianhydrides such as ethylenetetracarboxylic dianhydride, butanetetracarboxylic dianhydride, cyclopentanetetracarboxylic dianhydride, pyromellitic dianhydride, 3,3',4,4'-benzophenonetetracarboxylic dianhydride 2,2',3,3'-benzophenonetetracarboxylic dianhydride, 3,3',4,4'-biphenyltetracarboxylic dianhydride, 2,2',3,3'-biphenyltetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl)ether dianhydride, bis(3,4-dicarboxyphenyl)sulfone dianhydride, bis(2,3- dicarboxyphenyl)sulfone dianhydride, bis(2,3-dicarboxyphenyl)methane dianhydride, bis(3,4-dicarboxyphenyl)methane dianhydride, 1,1-bis(2,3-dicarboxyphenyl)ethane dianhydride, 1,1-bis(3,4-dicarboxyphenyl)ethane dianhydride, 1,2-bis(2,3-dicarboxyphenyl)ethane dianhydride, 1,2-bis(3,4-dicarboxyphenyl)ethane dianhydride, 1,3-bis(2,3-dicarboxyphenoxy)benzene dianhydride, 1,3-bis(3,4-dicarboxyphenoxy)benzene dianhydride, 1,4-bis(2,3-dicarboxyphenoxy)benzene dianhydride, 1,4-bis(3,4-dicarboxyphenoxy)benzene dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 1,3-bis[4-(1,2-dicarboxy)phenoxy]benzene dianhydride, 1,4-bis[4-(1,2-dicarboxy)phenoxy]benzene dianhydride, 1,4-bis[3-(1,2-dicarboxy)phenoxy]benzene dianhydride, 1,3-bis[4-(1,2-dicarboxy)-α,α-dimethylbenzyl]benzene dianhydride, 1,3-bis[3-(1,2-dicarboxy)-α,α-dimethylbenzyl]benzene dianhydride, 1,4-bis[3-(1,2-dicarboxy)-α,α-dimethylbenzyl]benzene dianhydride, 1,4-bis[4-(1,2-dicarboxy)-α,α-dimethylbenzyl]benzene dianhydride, 2,2-bis[4-(4-(1,2-dicarboxy)phenoxy)phenyl]propane dianhydride, 2,2-bis[4-(3-(1,2-dicarboxy)phenoxy)phenyl]propane dianhydride, bis[4-(4-(1,2-dicarboxy)phenoxy)phenyl]ketone dianhydride, bis[4-(3-(1,2-dicarboxy)phenoxy)phenyl]ketone dianhydride, bis[4-(4-(1,2-dicarboxy)phenoxy)phenyl]sulfone dianhydride, bis[4-(3-(1,2-dicarboxy)phenoxy)phenyl]sulfone dianhydride, bis[4-(4-(1,2-dicarboxy)phenoxy)phenyl]sulfide dianhydride, bis[4-(3-(1,2-dicarboxy)phenoxy)phenyl]sulfide dianhydride, bis[4-(4-(1,2-dicarboxy)phenoxy)phenyl]-1,1,1,3,3,3-hexafluoropropane dianhydride and bis[4-(3-(1,2-dicarboxy)phenoxy)phenyl]-1,1,1,3,3,3-hexafluoropropane dianhydride, ethylene glycol bis(anhydro-trimellitate).

In addition to aromatic tetracarboxylic acid dianhydrides, aliphatic tetracarboxylic acid dianhydrides can also be used so far as their use does not deteriorate heat resistance. Preferable examples of said dianhydride include aliphatic tetracarboxylic acid dianhydrides such as 5-(2,5-dioxotetrahydrol)-3-methyl-3-cyclohexane-1,2-dicarboxylic anhydride, 4-(2,5-Dioxotetrahydrofuran-3-yl)-tetraline-1,2-dicarboxylic anhydride, bicyclo(2,2,2)-7-ene-2,3,5,6-tetracarboxylic dianhydride, 1,2,3,4-cyclopentane tetracarboxylic dianhydride.

These dianhydrides can be used singly or as a mixture.

Diamines which can be used in combination, include, m-phenylenediamine, o-phenylenediamine, p-phenylenediamine, m-aminobenzylamine, o-aminobenzylamine, 3-chloro-1,2-phenylenediamine, 4-chloro-1,2-phenylenediamine, 2,3-diaminotoluene, 2,4-diaminotbluene, 2,5-diaminotoluene, 2,6-diaminotoluene, 3,4-diaminotoluene, 3,5-diaminotoluene, 2-methoxy-1,4-phenylenediamine, 4-methoxy-1,2-phenylenediamine, 4-methoxy-1,3-phenylenediamine, benzidine, 3,3'-dimethylbenzidine, 3,3'-dimethoxybenzidine, 3,3'-dichlorobenzidine, 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfoxide, 3,4'-diaminodiphenyl sulfoxide, 4,4'-diaminodiphenyl sulfoxide, 3,3'-diaminodiphenyl sulfone, 3,4'-diaminodiphenyl sulfone, 4,4'-diaminodiphenyl sulfone, 3,3'-diaminobenzophenone, 3,4'-diaminobenzophenone, 4,4'-diaminobenzophenone, 3,3'-diaminodiphenyl methane, 3,4-diaminodiphenyl methane, 4,4'-diaminodiphenyl methane, bis[4-(3-aminophenoxy)phenyl]methane, bis[4-(4-aminophenoxy)phenyl]methane, bis[3-(3-aminophenoxy)phenyl]methane, 1,1-bis[4-(4-aminophenoxy)phenyl]ethane, 1,2-bis[4-(4-aminophenoxy)phenyl]ethane, 1,1-bis[4-(3-aminophenoxy)phenyl]ethane, 1,2-bis[4-(3-aminophenoxy)phenyl]ethane, 1,1-bis[4-(4-aminophenoxy)phenyl]propane, 1,2-bis[4-(4-aminophenoxy)phenyl]propane, 1,3-bis[4-(4-aminophenoxy)phenyl]propane, 2,2-bis[4-(4-aminophenoxy)phenyl]propane, 1,1-bis[4-(4-aminophenoxy)phenyl]propane, 1,2-bis[4-(3-aminophenoxy)phenyl]propane, 1,3-bis[4-(3-aminophenoxy)phenyl]propane, 2,2-bis[4-(3-aminophenoxy)phenyl]propane, 1,1-bis[4-(4-aminophenoxy)phenyl]butane, 1,2-bis[4-(4-aminophenoxy)phenyl]butane, 1,3-bis[4-(4-aminophenoxy)phenyl]butane, 1,4-bis[4-(4-aminophenoxy)phenyl]butane, 2,2-bis[4-(4-aminophenoxy)phenyl]butane, 2,3-bis[4-(4-aminophenoxy)phenyl]butane, 1,1-bis[4-(3-aminophenoxy)phenyl]butane, 1,2-bis[4-(3-aminophenoxy)phenyl]butane, 1,3-bis[4-(3-aminophenoxy)phenyl]butane, 1,4-bis[4-(3-aminophenoxy)phenyl]butane, 2,2-bis[4-(3-aminophenoxy)phenyl]butane, 2,3-bis[4-(3-aminophenoxy)phenyl]butane, 2-[4-(4-aminophenoxy)phenyl]-2-[4-(4-aminophenoxy)-3-methylphenyl]propane, 2,2-bis[4-(4-aminophenoxy)-3-methylphenyl]propane, 2-[4-(4-aminophenoxy)phenyl]-2-[4-(4-aminophenoxy)-3,5'-dimethylphenyl]propane, 2,2-bis[4-(4-aminophenoxy)-3,5-dimethylphenyl]propane, 2,2-bis[4-(4-aminophenoxy)phenyl]-1,1,1,3,3,3-hexafluoropropane, 2,2-bis[3-(4-aminophenoxy)phenyl]-1,1,1,3,3,3-hexafluoropropane, 2,2-bis[4-(3-aminophenoxy)phenyl]-1,1,1,3,3,3-hexafluoropropane, 2,2-bis[3-(3-aminophenoxy)phenyl]-1,1,1,3,3,3-hexafluoropropane, 1,3-bis(3-aminophenoxy)benzene, 1,3-bis(4-aminophenoxy)benzene, 1,4-bis(4-aminophenoxy)benzene, 1,4-bis(3-aminophenoxy)benzene, 4,4'-bis(3-aminophenoxy)biphenyl, 3,3'-bis(3-aminophenoxy)biphenyl, bis[3-(4-aminophenoxy)phenyl]ketone, bis[4-(4-aminophenoxy)phenyl]ketone, bis[4-(3-aminophenoxy)phenyl]ketone, bis[3-(3-aminophenoxy)phenyl]ketone, bis[4-(4-aminophenoxy)phenyl]sulfide, bis[3-(4-aminophenoxy)phenyl]sulfide, bis[3-(3-aminophenoxy)phenyl]sulfide, bis[4-(3-aminophenoxy)phenyl]sulfide, bis[4-(4-aminophenoxy)phenyl]sulfoxide, bis[4-(4-aminophenoxy)phenyl]sulfone, bis[3-(4-aminophenoxy)phenyl]sulfone, bis[3-(4-aminophenoxy)phenyl]sulfone, bis[4-(3-aminophenoxy)phenyl]sulfone, bis[4-(4-aminophenoxy)phenyl]ether, bis[4-(4-aminophenoxy)phenyl]ether, bis[3-(3-aminophenoxy)phenyl]ether, bis[3-(4-aminophenoxy)phenyl]ether, 1,4-bis[4-(3-aminophenoxy)benzoyl]benzene, 1,3-bis[4-(3-aminophenoxy)benzoyl]benzene, 1,4-bis[4-(4-aminophenoxy)benzoyl]benzene, 1,3-bis[4-(4-aminophenoxy)benzoyl]benzene, 4,4'-bis(3-aminophenoxy)-3-methylbiphenyl, 4,4'-bis(3-aminophenoxy)-3,3'-dimethylbiphenyl, 4,4'-bis(3-aminophenoxy)-3,5-dimethylbiphenyl, 4,4'-bis(3-aminophenoxy)-3,3',5,5'-tetramethylbiphenyl, 4,4'-bis(3-aminophenoxy)-3,3'-dichlorobiphenyl, 4,4'-bis(3-aminophenoxy)-3,5-dichlorobiphenyl, 4,4'-bis(3-aminophenoxy)-3,3',5,5'-tetrachlorobiphenyl, 4,4'-bis(3-aminophenoxy)-3,3'-dibromobiphenyl, 4,4'-bis(3-aminophenoxy)-3,5-dibromobiphenyl, 4,4'-bis(3- aminophenoxy)-3,3',5,5'-tetrabromobiphenyl, bis[4-(3-aminophenoxy)-3-methoxyphenyl]sulfide, [4-(3-aminophenoxy)phenyl][4-(3-aminophenoxy)-3,5-dimethoxyphenyl]sulfide, bis[4-(3-aminophenoxy)-3,5-dimethoxyphenyl]sulfide, and 1,3-bis[4-(4-aminophenoxy)-.alpha.,.alpha.-dimethylbenzyl]benzene.

These diamines can be used singly or as a mixture.

Triamines or tetraamines which can be used in combination, include, 1,2,3-triaminobenzene, 1,2,4-triaminobenzene, 1,2,4,5-tetraaminobenzene, 3-aminobenzidine, 3,3'-diaminobenzidine, 3,4,4'-triaminodiphenyl ether, 3,3',4,4'-tetraaminodiphenyl either, 3,4,4'-triaminobenzophenone, 3,3',4,4'-tetraaminobenzophenone, 3,4,4'-triaminodiphenylmethane, 3,3',4,4'-tetraaminodiphenylmethane, 3,4,4'-triaminodiphenyl sulfide, 3,3',4,4'-tetraaminodiphenyl sulfide, 3,4,4'-triaminodiphenyl sulfone, 3,3',4,4'-tetraaminodiphenyl sulfone, 2,2-bis(3,4-diaminophenyl)-propane, 4,4'-bis(3,4-diaminophenoxy)biphenyl, 2,2-bis[4-(3,4-diaminophenoxy)phenyl]-propane, 2,2-bis(3,4-diaminophenyl)-hexafluoropropane, and 2,2-bis[4-(3,4-diaminophenoxy)phenyl]-hexafluoropropane.

These triamines or tetraamines can be used singly or as a mixture.

The polymer can be normally prepared by reacting diamine and triamine or tetraamine with dianhydride in organic solvents.

The organic solvents used in the reaction include, N,N-dimethylformamide, N,N-dimethylacetamide, N,N-diethylacetamide, N-N-dimethyl-methoxyacetamide, N-methyl-2-pyrrolidone, 1,3-dimethyl-2-imidazolidone, N-methyl caprolactam, 1,2-dimethoxyethane, bis(2-methoxyethyl) ether, 1,2-bis(2-methoxyethoxy)ethane, bis[2-(2methoxyethoxy)ethyl]ether, tetrahydrofuran, 1,3-dioxane, 1,4-dioxane, pyridine, picoline, dimethyl sulfoxide, dimethyl sulfone, tetramethylurea, hexamethylphosphoramide, m-cresol, p-chlorophenol and anisole. These solvents can be used alone or in mixtures of two or more.

The polyamic acid varnish is manufactured as follows:

First, a polyamic acid varnish, which is a polyimide precursor, is prepared by dissolving a diamine and triamine or tetramaine in a polar solvent such as N-methyl pyrrolidone, adding a tetracarboxylic acid anhydride within a range of 90 to 110% by equivalent ratio, and allowing them to react. This equivalent ratio is preferably selected as being within a range of 95–103%.

Such an amic acid polymer has a logarithmic viscosity η of 0.05 to 3 dl/g as measured with an N,N-dimethylacetamide solvent medium of a concentration of 0.5 g/100 ml at 30° C. and preferably 0.1 to 1.5 dl/g.

In forming the polyamic acid, the reaction temperature is normally 80° C. or less and preferably 50° C. or less. As for reaction pressure, it is not particularly limited and atmospheric pressure suffices. The reaction period of time depends on types of solvents used and reaction temperatures, and is normally long enough to complete the formation of the polyamic acid represented by the Formula I. Normally, reaction for 4 to 24 hours is sufficient.

Reacting under the above mentioned conditions affords the polyamic acid having recurring units represented by the Formula I:

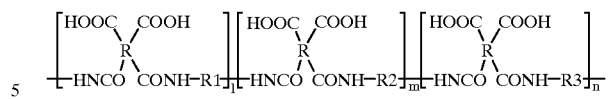

wherein
R is a tetravalent organic group; R1 is a divalent organic group; R2 is a trivalent or tetravalent organic group; R3 is a divalent organic group represented by the following formula:

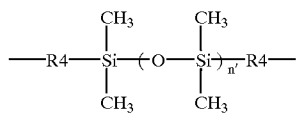

wherein
R4 is an alkylene group containing 0–20 carbon atoms; and n' is the number of a recurring unit; and l, m and n each are molar numbers of the corresponding recurring units under the condition that l/(m+n) ranges from 99.985/0.015 to 80/15 as expressed in terms of molar ratio and m/(l+n) is from 1/2000 to 500/1 as expressed in terms of molar ratio.

When the polyamino compound is a triamine, the molar ratio of polyamino compound to dianhydride is preferably adjusted to 0.7/1.5 to 1.3/1.5 and more preferably to 1.0/1.5. On the other hand, when the polyamino compound is a tetraamine, the molar ratio of polyamino compound to dianhydride is preferably adjusted to 0.7/2.0 and 1.3/2.0 and more preferably to 1.0/2.0.

In the next step, the thermal hydration of the polyamic acid solution at 100 to 400° C. and preferably at 100 to 300° C. or its chemical dehydration by treating with imidizing agent such as acetic anhydride affords the corresponding polyimide of the following Formula IV:

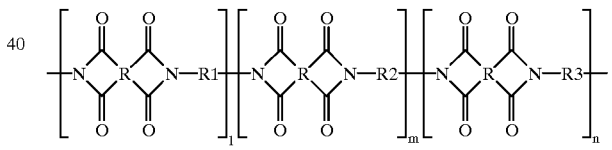

wherein,
R is a tetravalent organic group; R1 is a divalent organic group; R2 is a trivalent or tetravalent organic group; R3 is a divalent organic group represented by the following formula:

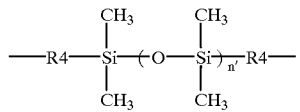

wherein
R4 is an alkylene group containing 0–20 carbon atoms and n' is the number of a recurring unit; and l, m and n each are molar numbers of the corresponding recurring units under the condition that l/(m+n) ranges from 99.985/0.015 to 80/15 as expressed in terms of molar ratio and m/(l+n) is from 1/2000 to 500/1 as expressed in terms of molar ratio.

When m/(l+n) is less than 0.005/99.985, the crosslinking effect causing an increase in the terminal resistance, especially in thermal reliability, and the nonlinearity of molecular chains causing a decrease in packing density between molecular chains and an increase in melt-feasibility, are deficient providing polyimide adhesive having a good melt-feasibility and also a good heat-resistance. On the other hand, when m/(l+n) is more than 2/17, the crosslinking effect is too excessive to provide the appropriate melt-feasibility for an adhesive application.

According to the present invention, typical adhesives will be summarized as follows:

1. The polyimide adhesive is formed of a structural unit expressed by the Formula VI.
2. The precursor of the polyimide adhesive including a polyamic acid or a polyamic acid ester can be condensed into the polyimide of the Formula VI by thermal or chemical imidization.

And typical insulating adhesive tapes will be summarized as an insulating adhesive tape with comprises a base supporting film and a polyimide adhesive layer formed of a structural unit expressed by the Formula VI on at least one side of the supporting film.

And, typical insulating adhesive tapes could be made as follows:

1. The polyimide varnish (the polyimide adhesive formed of the Formula VI which can be solubilized in a organic solvent), is coated on at least one side of the supporting film, and the solvent is dried at at least 250° C., and more preferably at at least 300° C. in order to eliminate the residual solvent.
2. The polyamic acid varnish or the polymer acid ester varnish (the precursor of polyimide adhesive including a polyamic acid or a polyamic acid ester which is solubilized in an organic solvent), is coated on at least one side of the supporting film, and solvent is dryed at at least 250° C., and more preferably at at least 300° C. in order to eliminate the residual solvent and to imidize an adhesive layer.

A polymer with an imide bond may be used as a material for the insulating supporting film.

Such a material may be exemplified as follows: a polyimide film including Regulus (a trademark of Mitsui Toatsu Chemicals, Inc.), Kapton H, V, E, K and ZT (respectively, a trademark of Du Pont Co.), Upilex M, S, SGA, SGAPA (respectively, a trademark of Ube Industries, Ltd.), Apical AH, NPI, HP (respectively, a trademark of Kanegafuchi Chemical Industry Co., Ltd.), or an aramid film such as Aramica (a trademark of Asahi Chemical Industry Co., Ltd). In these materials, it is recommended to use a polyimide film with a low CTE (Coefficient of Thermal Expansion), particularly of, a material of Upilex S, SGA type, Kapton E type, and Apical HP type. The thickness of the base film is not particularly limited. However, it is preferable that the thickness ranges from 1 to 500 $\mu$m and more preferably from 3 to 50 $\mu$m.

Before an adhesive polymer layer containing a polyimide is formed on the base film, it is preferable to subject the surface of a substrate to a plasma treatment or ozone treatment. It is well-known to roughen the surface of a substrate by these treatments or to form chemically a functional group such as a carboxyl radical on the same. The adhesive strength to the substrate can largely be improved and stabilized.

For carrying out the present invention, it is important that the adhesive polymer forming the layer has a glass transition temperature ranging from 135° C. to 280° C., and has a storage modulus ranging from 1010 to 1011 dyne/cm2 at 25° C., which is a storage modulus ranging from 102 to 109 dyne/cm2 at a wire bonding temperature ranging from 150° C. to 300° C.

If the glass transition temperature is less than 135° C. or the storage modulus is less than 102 dyne/cm2 at a wire bonding temperature, then a problem will occur because the inner lead is moved during the wire bonding process or energy cannot properly be transferred to the inner lead in ultrasonic heating.

On the contrary, if the glass transition temperature is more than 280° C. or the storage modulus is more than 1010 dyne/cm2 at the wire bonding temperature, it will take a great amount of time to perform thermo-melting-bonding for the lead frame and IC chip, whereby it is difficult to execute a short time bonding, a rapid bonding or the bonding for a short period of time).

In order to embody the present invention, it is desirable that the amount of the solvent contained within the adhesive layer formed over the base film is not more than 1% and that the imide reaction of the adhesive polyimide has been substantially completed. This can prevent the solvent volatilization of the volatilization of moisture produced due to an imidization chemical reaction during the rapid thermo-melting-bonding at high temperature (generally, over 270° C.) from contaminating the surface of the lead from IC chip, or producing a void in the adhesive layer.

The ionic impurities of sodium, potassium, chlorine, sulphate ion etc. in the adhesive polyimide are trace or about 1 $\mu$g/g (by the hydrothermal extracting method, calculated based on the amount of ions extracted from a water at 121° C. for 24 hours).

For these reasons, it does not occur that electronic circuits around the insulating adhesive tape used for adhesion are eroded by ionic impurities within the tape or that the metal migration makes a short circuit.

Since the amount of the radioactive element such as uranium, or thorium causing software errors in a semiconductor memory is less than the detection limit of a radio-activation analyzer, i.e. less than 0.6 pph, the reliability of the semiconductor memory can be maintained at a very high level for a long period.

The water absorbing ratio of the adhesive layer is less than 1.8% (after immersing in a pure water at 23.° C. for 24 hours). Since the value is ¾ to ³⁄₁₀ of that of polyether amide and polyether amide-imide generally used, the void formation can be largely decreased, which is caused by possible water vapor during an adhering process under high temperature.

The adhesive polymer layer comprising a polyimide can be formed by coating a polyimide varnish or a polyamic acid or a polyamic acid ester (as a polyimide precursor), or the mixture of the above varnishes.

Moreover, before the varnish is coated on the base film, the varnish, if necessary, may be mixed with a filler such as silica which does not contain a radio-active element such as uranium and thorium. It is necessary that the content of an adhesive polyimide is not less than 50% by weight, preferably not less than 75% by weight, more preferably not less than 90% by weight, and still more preferably not less than 95% by weight.

The adhesive polymer layers are particularly not limited to the thickness thereof. However, it is desirable that the thickness ranges from more than 1 $\mu$m to less than 100 $\mu$m, and preferably from more than 3 $\mu$m to less than 50 $\mu$u.

Well-known devices such as a comma-type coater, a three reverse coater and a die coater may be used for coating. In the drying and imidizing method, a conventional roll carrying dryer may be used when the adhesive polymer layer is formed on one surface of the base film or on the both surfaces of the base film. A floating dryer also can be recommended when an adhesive polymer is formed on the both surfaces of the base film.

Generally, the drying conditions depend on the thickness of the adhesive polymer, the concentration of a varnish and the drying method. For example, when the varnish has its concentration of 25% and its thickness of 25 μm after drying, the drying is generally performed for 2 to 30 minutes at 80° C. to 150° C., 150° C. to 200° C., 200° C. to 250° C., or 250° C. to 300° C. Temperatures over a range of 300° C. to 400° C., can reduce the drying time to 10 minutes or less and guarantee the complete elimination of the residual solvent and also the complete imidization of adhesive.

A better understanding of the present invention may be obtained in light of the following examples which are set forth to illustrate, but are not to be construed to limit the present invention.

EXAMPLE 1

13.851 g (0.0376 mol) of 4,4'-bis(4-aminophenoxy)biphenyl, 0.057 g (0.0002 mol) of 3,3',4,4'-tetraaminobiphenyl, 0.497 g (0.0020 mol) of 1,3-bis(4-aminopropyl)-tetramethyldisiloxane and 156.8 g of N,N-dimethylacetamide were introduced into a container equipped with an agitator, a reflux condenser, and a nitrogen introducing pipe. Then 4.296 g (0.012 mol) of 3,3',4,4'-diphenylsulfone tetracarboxylic dianhydride and 8.686 g (0.028 mol) 4,4'-oxydiphtalic anhydride were divided into four portions and added into the container under a nitrogen atmosphere at room temperature and the mixture was stirred for 20 hours at room temperature. The logarithmic viscosity η of the resultant polyamic acid was 0.85 dl/g.

EXAMPLE 2

13.851 g (0.0376 mol) of 4,4'-bis(4-aminophenoxy)biphenyl, 0.062 g (0.00027 mol) of 3,3',4,4'-triaminodiphenylsulfide, 0.497 g (0.0020 mol) of 1,3-bis(4-aminopropyl)-tetramethyldisiloxane, and 158.9 g of N,N-dimethylacetamide were introduced into a container equipped with an agitator, a reflux condenser, and a nitrogen introducing pipe. Then 4.296 g (0.012 mol) of 3,3',4,4'-diphenylsulfone tetracarboxylic dianhydride and 8.686 g (0.028 mol) 4,4'-oxydiphtalic anhydride were divided into four portions and added into the container under a nitrogen atmosphere at room temperature and the mixture was stirred for 20 hours at room temperature. The logarithmic viscosity η of the resultant polyamic acid was 0.80 dl/g.

EXAMPLE 3

13.851 g (0.0376 mol) of 4,4'-bis(4-aminophenoxy)biphenyl, 0.043 g (0.00027 mol) of 3,3',4,4'-triaminodiphenylether, 0.497 g (0.0020 mol) of 1,3-bis(4-aminopropyl)-tetramethyldisiloxane, and 155.9 g of N,N-dimethylacetamide were introduced into a container equipped with an agitator, a reflux condenser, and a nitrogen introducing pipe. Then 4.296 g (0.012 mol) of 3,3',4,4'-diphenylsulfone tetracarboxylic dianhydride and 8.686 g (0.028 mol) 4,4'-oxydiphtalic anhydride were divided into four portions and added into the container under a nitrogen atmosphere at room temperature and the mixture was stirred for 20 hours at room temperature. The logarithmic viscosity η of the resultant polyamic acid was 0.90 dl/g.

COMPARATIVE EXAMPLE 1

14.736 g (0.040 mol) of 4,4'-bis(4-aminophenoxy)biphenyl and 155.9 g of N,N-dimethylacetamide were introduced into a container equipped with an agitator, a reflux condenser, and a nitrogen introducing pipe. Then 4.296 g (0.012 mol) of 3,3',4,4'-diphenylsulfone tetracarboxylic dianhydride and 8.68 g (0.028 mol) 4,4'-oxydiphtalic anhydride were divided into four portions and added into the container under a nitrogen atmosphere at room temperature and the mixture was stirred for 20 hours at room temperature. The logarithmic viscosity η of the resultant polyamic acid was 0.70 dl/g.

COMPARATIVE EXAMPLE 2

13.262 g (0.0360 mol) of 4,4'-bis(4-aminophenoxy)biphenyl, 0.857 g (0.0020 mol) of 3,3',4,4'-tetraaminobiphenyl and 156.8 g of N,N-dimethylacetamide were introduced into a container equipped with an agitator, a reflux condenser, and a nitrogen introducing pipe. Then 4.296 g (0.012 mol) of 3,3',4,4'-diphenylsulfone tetracarboxylic dianhydride and 8.686 g (0.028 mol) 4,4'-oxydiphtalic anhydride were divided into four portions and added into the container under a nitrogen atmosphere at room temperature and the mixture was stirred for 20 hours at room temperature. The logarithmic viscosity η of the resultant polyamic acid was 1.05 dl/g.

The above 5 kinds of polyamic acid varnishes are coated on the glass plate and also Upilex-S film, and heated for one hour each at 80° C., 150° C., 200° C., and 300° C.

In accordance with the DMTA extension method, a glass transition temperature and storage Modulus of polyimide films are obtained, and in accordance with DTA-TG a five percent weight loss temperature in air is obtained.

Adhesive tapes which consist of polyimide adhesive and Upilex-SGA film are bonded into a Cu plate, an NiFe alloy plate, and a PIX-3000 (Hitachi Chemical Co.) coated plate at 400° C. at a pressure of 10 Kg/cm2 for 1 second. The T-peel strength of the bonded specimen is obtained at room temperature (when measured at a pulling rate of 50 mm/min). The results are given in Table 1, below.

TABLE 1

| Nos. of Examples | Tg (° C.) | 5% Wt. Loss Temp. | Storage Modulus | | Active Strength (kg/cm) | | |
|---|---|---|---|---|---|---|---|
| | | | at 25° C. | at 230° C. | Cu | NiFe | PIX-3000 |
| 1 | 231 | 523 | $1.7 \times 10^{10}$ | $2.8 \times 10^{9}$ | 1.10 | 1.20 | 1.30 |
| 2 | 227 | 521 | $1.7 \times 10^{10}$ | $1.9 \times 10^{9}$ | 1.15 | 1.20 | 1.35 |
| 3 | 225 | 521 | $1.7 \times 10^{10}$ | $3.1 \times 10^{9}$ | 1.20 | 1.30 | 1.30 |
| C. 1 | 231 | 517 | $1.7 \times 10^{10}$ | $6.7 \times 10^{9}$ | 0.75 | 0.75 | 0.60 |
| C. 2 | 242 | 525 | $2.8 \times 10^{10}$ | $7.9 \times 10^{10}$ | 0.60 | 0.65 | 0.50 |

EXAMPLE 4

13.925 g (0.0378 mol) of 4,4'-Bis(4-aminophenoxy)biphenyl, 0.029 g (0.0001 mol) of 3,3',4,4'-

Tetraaminobiphenyl, 0.497 g (0.0020 mol) of 1,3-bis(4-aminopropyl)-tetramethyldisiloxane, and 175.8 g of N-methyl-2-pyrolidone were introduced into a container equipped with an agitator, a reflux condenser, and a nitrogen introducing pipe. Then 3.867 g (0.012 mol) of 3,3',4,4'-benzophenone tetracarboxylic dianhydride and 12.439 g (0.028 mol) 4,4'-(Hexafluoroisopropylidene)diphtalic anhydride were divided into four portions and added into the container under a nitrogen atmosphere at room temperature and the mixture was stirred for 20 hours at room temperature. The logarithmic viscosity η of the resultant polyamide acid was 0.65 dl/g.

EXAMPLE 5

13.925 g (0.0378 mol) of 4,4'-bis(4-aminophenoxy)biphenyl, 0.031 g (0.00015 mol) of 3,3',4,4'-triaminodiphenylsulfide, 0.497 g (0.0020 mol) of 1,3-bis(4-aminopropyl)-tetramethyldisiloxane, and 176.7 g of N-methyl-2-pyrolidone were introduced into a container equipped with an agitator, a reflux condenser, and a nitrogen introducing pipe. Then 3.867 g (0.012 mol) of 3,3',4,4'-benzophenone tetracarboxylic dianhydride and 12.439 g (0.028 mol) 4,4'-(Hexafluoroisopropylidene)diphtalic anhydride were divided into four portions and added into the container under a nitrogen atmosphere at room temperature and the mixture was stirred for 20 hours at room temperature. The logarithmic viscosity η of the resultant polyamide acid was 0.85 dl/g.

EXAMPLE 6

13.925 g (0.0378 mol) of 4,4'-bis(4-aminophenoxy)biphenyl, 0.021 g (0.00015 mol) of 3,3',4'-triaminodiphenylether, 0.497 g (0.0020 mol) of 1,3-bis(4-aminoproyl)-tetramethyldisiloxane, and 175.3 g of N-methyl-2-pyrolidone were introduced into a container equipped with an agitator, a reflux condenser, and a nitrogen introducing pipe. Then 3.867 g (0.012 mol) of 3,3',4,4'-benzophenone tetracarboxylic dianhydride and 12.439 g (0.0028 mol) 4,4'-(Hexafluoroisopropylidene)diphtalic anhydride were divided into four portions and added into the container under a nitrogen atmosphere at room temperature and the mixture was stirred for 20 hours at room temperature. The logarithmic viscosity η of the resultant polyamide acid was 0.85 dl/g.

COMPARATIVE EXAMPLE 3

14.736 g (0.040 mol) of 4,4'-bis(4-aminophenoxy)biphenyl and 175.8 g of N-methyl-2-pyrolidone were introduced into a container equipped with an agitator, a reflux condenser, and a nitrogen introducing pipe. Then 3.867 g (0.012 mol) of 3,3',4,4'-benzophenone tetracarboxylic dianhydride and 12.439 g (0.028 mol) 4,4'-(Hexafluoroisopropylidene)diphtalic anhydride were divided into four portions and added into the container under a nitrogen atmosphere at room temperature and the mixture was stirred for 20 hours at room temperature. The logarithmic viscosity η of the resultant polyamic acid was 0.55 dl/g.

COMPARATIVE EXAMPLE 4

13.262 g (0.0360 mol) of 4,4'-bis(4-aminophenoxy)biphenyl, 0.857 g (0.0020 mol) of 3,3',4,4'-tetraaminobiphenyl and 175.8 g of N-methyl-2-pyrolidone were introduced into a container equipped with an agitator, a reflux condenser, and a nitrogen introducing pipe. Then 3.867 g (0.012 mol) of 3,3',4,4'-benzophenone tetracarboxylic dianhydride and 12.439 g (0.028 mol) 4,4'-(Hexafluoroisopropylidene)diphtalic anhydride were divided into four portions and added into the container under a nitrogen atmosphere at room temperature and the mixture was stirred for 20 hours at room temperature. The logarithmic viscosity η of the resultant polyamide acid was 0.80 dl/g.

The above 5 kinds of polyamic acid varnishes are coated on the glass plate and also Upilex-S film, and heated for one hour each at 80° C., 150° C., 200° C., and 300° C.

In accordance with the DMTA extension method, a glass transition temperature and storage modulus of polyimide films are obtained, and in accordance with DTA-TG a five percent weight loss temperature in air is obtained.

Adhesive tapes which consist of polyimide adhesive and Upilex-SGA film are bonded into a Cu plate, an NiFe alloy plate, and a PIX-3000 (Hitachi Chemical Co.) coated plate at 400° C. at a pressure of 10 Kg/cm2 for 1 second. The T-peel strength of bonded specimen is obtained at room temperature (when measured at a pulling rate of 50 mm/min). The results are given in Table 2, below.

TABLE 2

| Nos. or Examples | Tg (° C.) | 5% Wt. Loss Temp. | Storage Modulus at 25° C. | at 230° C. | Active Strength (kg/cm) Cu | NiFe | PIX-3000 |
|---|---|---|---|---|---|---|---|
| 4 | 233 | 517 | $2.1 \times 10^{10}$ | $7.3 \times 10^{9}$ | 1.50 | 1.65 | 1.20 |
| 5 | 221 | 516 | $2.1 \times 10^{10}$ | $6.1 \times 10^{9}$ | 1.45 | 1.50 | 1.25 |
| 6 | 233 | 515 | $2.2 \times 10^{10}$ | $7.7 \times 10^{9}$ | 1.60 | 1.45 | 1.30 |
| C. 3 | 236 | 511 | $2.0 \times 10^{10}$ | $2.3 \times 10^{8}$ | 0.65 | 0.75 | 0.55 |
| C. 4 | 242 | 522 | $2.3 \times 10^{10}$ | $5.2 \times 10^{10}$ | 0.70 | 0.60 | 0.55 |

EXAMPLE 7

19.496 g (0.0376 mol) of 2,3-bis[4-(4-aminophenoxy)phenyl]hexafluoropropane and 0.057 g (0.0002 mol) of 3,3',4,4'-tetraaminobiphenyl, 0.497 g (0.0020 mol) of 1,3-bis(4-aminopropyl)-tetramethyldisiloxane, and 186.6 g of N-methyl-2-pyrolidone were introduced into a container equipped with an agitator, a reflux condenser, and a nitrogen introducing pipe, and agitated under a nitrogen atmosphere at room temperature to dissolve. Then 7.398 g (0.028 mol) of 5-(2,5-dioxotetrahydrol)-3-methyl-3-cyclohexane-1,2-dicarboylic anhydride and 4.920 g (0.012 mol) of ethylene glycol bis(anhydro-trimelliate) were added little by little into the container. The resultant mixture was raised up to 50° C. and then agitated for three hours. Then at 50° C. 37.24 g (0.04 mol) of γ-picoline was added into the resultant polyamide acid solution and then heated while being stirred in a flow of nitrogen. During heating, water produced with an imide reaction was removed out of the system. While the mixture was maintained at 185° C. for 6 hours to imidate thermally, the produced water and the reacted solvent carried by a flow of nitrogen was partially removed out of the system. Then the heating was stopped. The product was cooled to room temperature for about two hours while stirring. Then the product was stirred continuously for 3 hours. The logarithmic viscosity of the resultant polyimide varnish was 0.45 dl/g.

EXAMPLE 8

19.496 g (0.0376 mol) of 2,3-bis[4-(4-aminophenoxy) phenyl]hexafluoropropane and 0.062 g (0.00027 mol) of 3,3',4'-triaminodiphenylsulfide, 0.497 g (0.0020 mol) of 1,3-bis(4-aminopropyl)-tetramethyldisiloxane, and 186.6 g of N-methyl-2-pyrolidone were introduced into a container equipped with an agitator, a reflux condenser, and a nitrogen introducing pipe, and agitated under a nitrogen atmosphere at room temperature to dissolve. Then 7.398 g (0.028 mol) of 5-(2,5-dioxotetrahydrol)-3-methyl-3-cyclohexane-1,2-dicarboylic anhydride and 4.920 g (0.012 mol) of ethylene glycol bis(anhydro-trimelliate) were added little by little into the container. The resultant mixture was raised up to 50° C. and then agitated for three hours. Then at 50° C. 37.24 g (0.04 mol) of γ-picoline was added into the resultant polyamide acid solution and then heated while being stirred in a flow of nitrogen. During heating, water produced with an imide reaction was removed out of the system. While the mixture was maintained at 185° C. for 6 hours to imidate thermally, the produced water and the reacted solvent carried by a flow of nitrogen was partially removed out of the system. Then the heating was stopped. The product was cooled to room temperature for about two hours while stirring. Then the product was stirred continuously for 3 hours. The logarithmic viscosity of the resultant polyimide varnish was 0.55 dl/g.

EXAMPLE 9

19.496 g (0.0376 mol) of 2,3-bis[4-(4-aminophenoxy) phenyl]hexafluoropropane and 0.043 g (0.00027 mol) of 3,3',4'-triaminodiphenylether, 0.497 g (0.0020 mol) of 1,3-bis(4-aminopropyl)-tetramethyldisiloxane, and 185.3 g of N-methyl-2-pyrolidone were introduced into a container equipped with an agitator, a reflux condenser, and a nitrogen introducing pipe, and agitated under a nitrogen atmosphere at room temperature to dissolve. Then 7.398 g (0.028 mol) of 5-(2,5-dioxotetrahydrol)-3-methyl-3-cyclohexane-1,2-dicarboylic anhydride and 4.920 g (0.012 mol) of ethylene glycol bis(anhydro-trimelliate) were added little by little into the container. The resultant mixture was raised up to 50° C. and then agitated for three hours. Then at 50° C. 37.24 g (0.04 mol) of γ-picoline was added into the resultant polyamide acid solution and then heated while being stirred in a flow of nitrogen. During heating, water produced with an imide reaction was removed out of the system. While the mixture was maintained at 185° C. for 6 hours to imidate thermally, the produced water and the reacted solvent carried by a flow of nitrogen were partially removed out of the system. Then the heating was stopped. The product was cooled to room temperature for about two hours while stirring. Then the product was stirred continuously for 3 hours. The logarithmic viscosity of the resultant polyimide varnish was 0.45 dl/g.

COMPARATIVE EXAMPLE 5

20.74 g (0.040 mol) of 2,3-bis[4-(4-aminophenoxy) phenyl]hexafluoropropane and 186.6 g of N-methyl-2-pyrolidone were introduced into a container equipped with an agitator, a reflux condenser, and a nitrogen introducing pipe, and agitated under a nitrogen atmosphere at room temperature to dissolve. Then 7.398 g (0.028 mol) of 5-(2,5-dioxotetrahydrol)-3-methyl-3-cyclohexane-1,2-dicarboylic anhydride and 4.920 g (0.012 mol) of ethylene glycol bis(anhydro-trimelliate) were added little by little into the container. The resultant mixture was raised up to 50° C. and then agitated for three hours. Then at 50° C. 37.24 g (0.04 mol) of γ-picoline was added into the resultant polyamide acid solution and then heated while being stirred in a flow of nitrogen. During heating, water produced with an imide reaction was removed out of the system. While the mixture was maintained at 185° C. for 6 hours to imidate thermally, the produced water and the reacted solvent carried by a flow of nitrogen were partially removed out of the system. Then the heating was stopped. The product was cooled to room temperature for about two hours while stirring. Then the product was stirred continuously for 3 hours. The logarithmic viscosity of the resultant polyimide varnish was 0.35 dl/g.

COMPARATIVE EXAMPLE 6

18.666 g (0.0360 mol) of 2,3-bis[4-(4-aminophenoxy) phenyl]hexafluoropropane and 0.857 g (0.0020 mol) of 3,3',4,4'-tetraaminobiphenyl and 186.6 g of N-methyl-2-pyrolidone were introduced into a container equipped with an agitator, a reflux condenser, and a nitrogen introducing pipe, and agitated under a nitrogen atmosphere at room temperature to dissolve. Then 7.398 g (0.028 mol) of 5-(2,5-dioxotetrahydrol)-3-methyl-3-cyclohexane-1,2-dicarboxylic anhydride and 4.920 g (0.012 mol) of ethylene glycol bis(anhydro-trimelliate) were added little by little into the container. The resultant mixture was raised up to 50° C. and then agitated for three hours. Then at 50° C. 37.24 g (0.04 mol) of γ-picoline was added into the resultant polyamide acid solution and then heated while being stirred in a flow of nitrogen. During heating, water produced with an imide reaction was removed out of the system. While the mixture was maintained at 185° C. for 6 hours to imidate thermally, the produced water and the reacted solvent carried by a flow of nitrogen were partially removed out of the system. Then the heating was stopped. The product was cooled to room temperature for about two hours while stirring. Then the product was stirred continuously for 3 hours. The logarithmic viscosity of the resultant polyimide varnish was 0.65 dl/g.

The above 5 kinds of polyimide varnishes are coated on glass plates and also Upilex-S film, and heated for forty minutes at 80° C., 150° C., 200° C., and 300° C.

In accordance with the DMTA extension method, a glass transition temperature and storage modulus of polyimide films are obtained, and in accordance with DTA-TG a five percent weight loss temperature in air is obtained.

Adhesive tapes which consist of polyimide adhesive and Upilex-SGA film are bonded into a Cu plate, an NiFe alloy plate, and a PIX-3000 (Hitachi Chemical Co.) coated plate at 400° C., at a pressure of 10 Kg/cm2 for 1 second. The T-peel strength of bonded specimen is obtained at room temperature (when measured at a pulling rate of 50 mm/min). The results are given in Table 3, below.

TABLE 3

| Nos. of Examples | Tg (°C.) | 5% Wt. Loss Temp. | Storage Modulus at 25° C. | Storage Modulus at 230° C. | Active Strength (kg/cm) Cu | Active Strength (kg/cm) NiFe | Active Strength (kg/cm) PIX-3000 |
|---|---|---|---|---|---|---|---|
| 7 | 227 | 461 | $1.3 \times 10^{10}$ | $1.3 \times 10^{9}$ | 1.25 | 1.25 | 1.30 |
| 8 | 228 | 462 | $1.3 \times 10^{10}$ | $1.2 \times 10^{9}$ | 1.40 | 1.35 | 1.30 |
| 9 | 226 | 460 | $1.3 \times 10^{10}$ | $1.0 \times 10^{9}$ | 1.25 | 1.3C | 1.30 |
| C. 5 | 232 | 457 | $1.3 \times 10^{10}$ | $7.3 \times 10^{9}$ | 0.65 | 0.60 | 0.45 |
| C. 6 | 245 | 463 | $2.3 \times 10^{10}$ | $5.8 \times 10^{10}$ | 0.60 | 0.50 | 0.40 |

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

We claim:

1. A polyamic acid for an adhesive, represented by the following Formula:

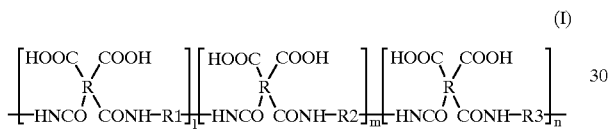

(I)

wherein, R is a tetravalent organic group selected from the group consisting of:

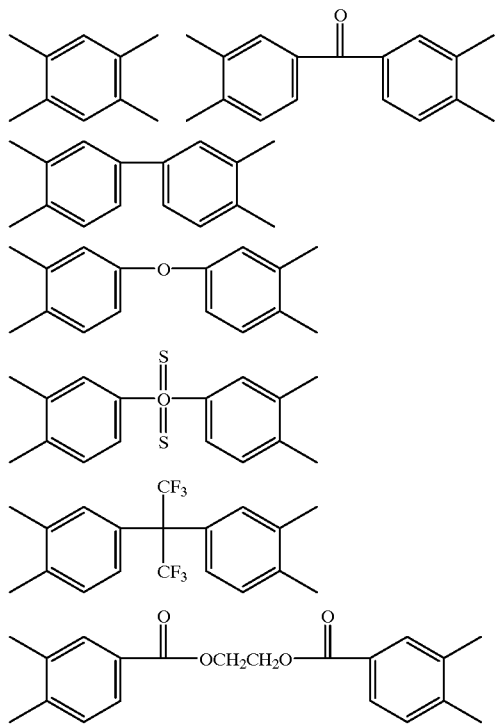

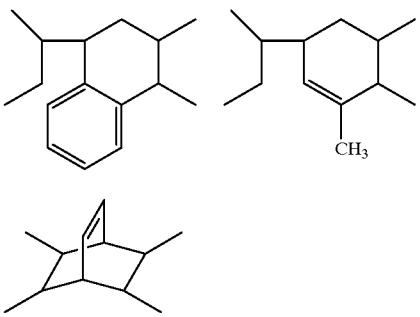

R1 is a divalent organic group selected from the group consisting of:

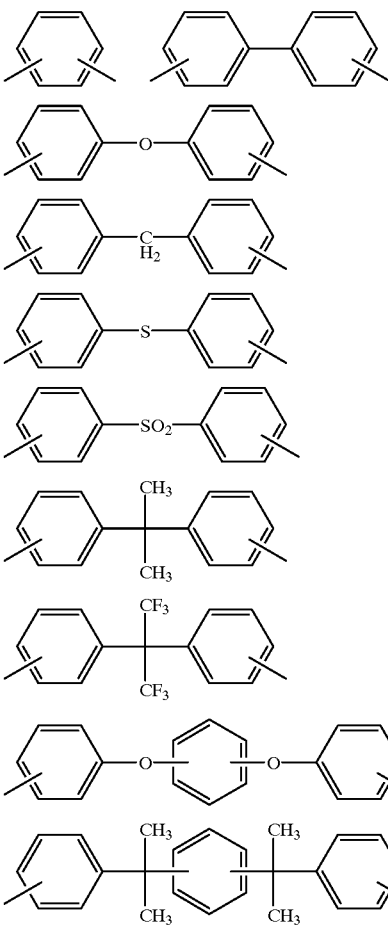

-continued

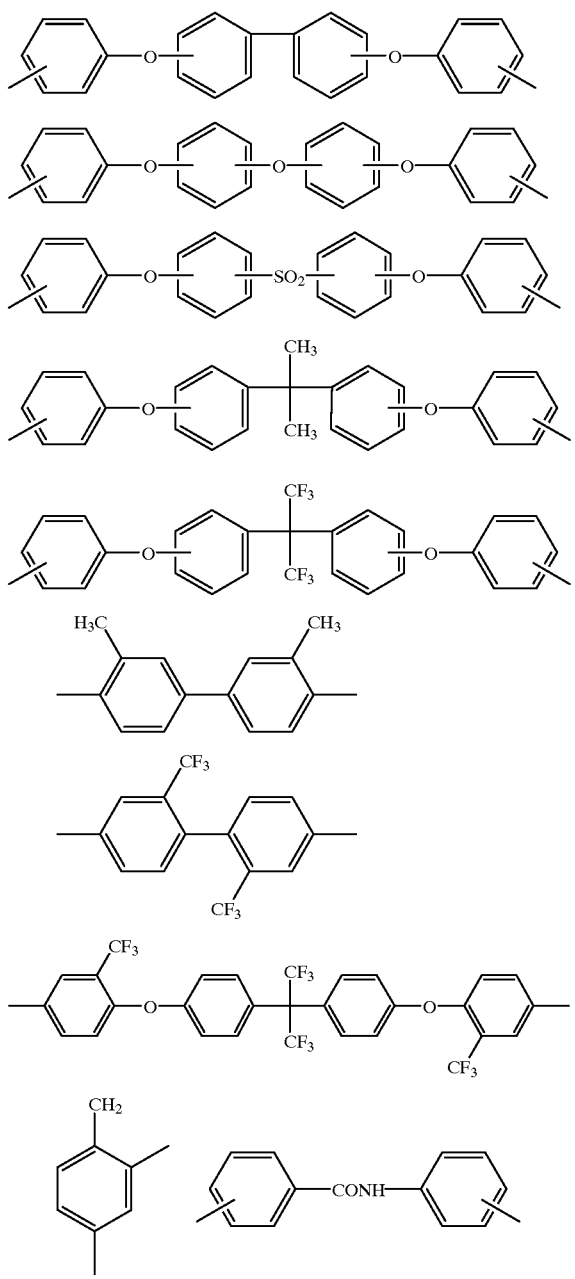

R2 is a trivalent or tetravalent organic group selected from the group consisting of:

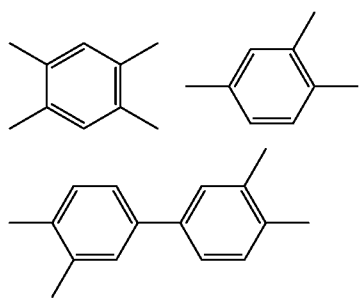

-continued

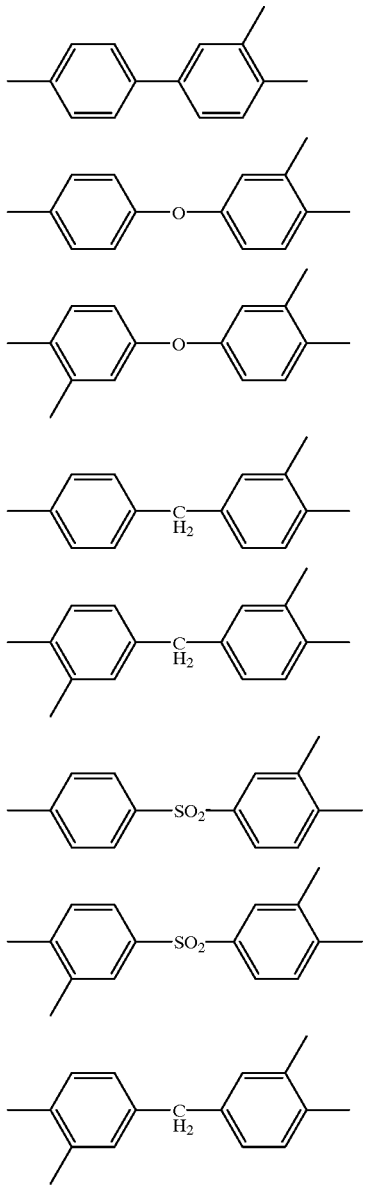

R3 is a divalent organic group represented by the following formula:

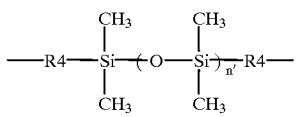

wherein, R4 is an alkylene group containing 1–20 carbon atoms and n' is the number of a recurring unit; and l, m and n each are molar numbers of the corresponding recurring units under the condition that l/(m+n) ranges from 99.985/0.015 to 80/15 as expressed in terms of molar ratio and m/(l+n) is from 1/2000 to 500/1 as expressed in terms of molar ratio.

2. A polyimide for an adhesive, represented by the following Formula II:

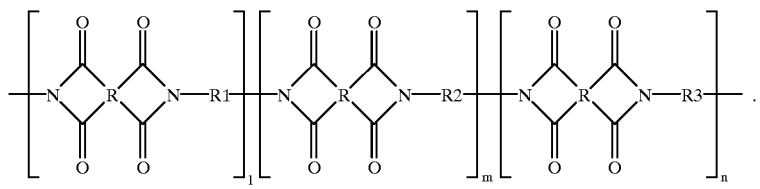

(II)

3. An insulating adhesive tape, comprising a base film coated with the polyimide of claim 2.

4. The polyimide as claimed in claim 2, wherein the polyimide is obtained through the thermal imidization of the polyamic acid of claim 1 at 100 to 400° C.

5. The polyimide as claimed in claim 2, wherein the polyimide is obtained through the chemical imidization of the polyamic acid of claim 1 with the aid of an imidizing agent.

* * * * *